United States Patent Office 3,412,793
Patented Nov. 26, 1968

3,412,793
PLUGGING HIGH PERMEABILITY
EARTH STRATA
Riley B. Needham, Bartlesville, Okla., assignor to Phillips
Petroleum Company, a corporation of Delaware
Filed Jan. 11, 1966, Ser. No. 519,907
5 Claims. (Cl. 166—11)

ABSTRACT OF THE DISCLOSURE

A highly permeable formation is temporarily plugged with a foam by introduction of steam and a foaming agent into the formation whereby a foam having steam as its gaseous phase is formed and upon condensation of the steam due to loss of heat the foam collapses.

---

Figure 1:
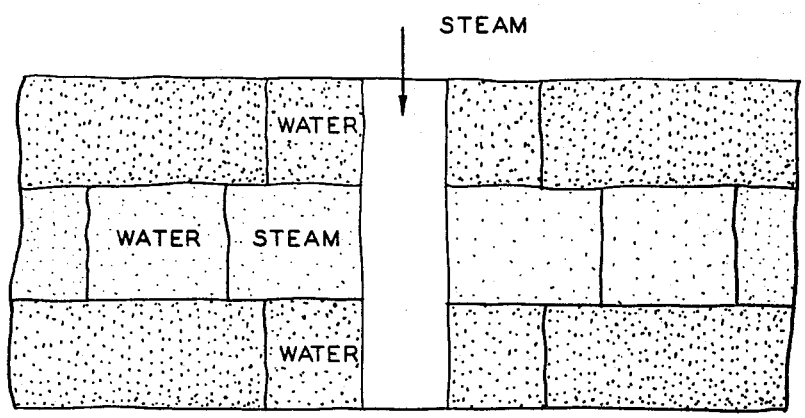

This invention relates to a process for plugging high permeability earth strata encountered in a well bore. In one aspect, it relates to a method of blocking earth strata forming therein a foam having a condensable gas as its gas phase. In another aspect, it relates to a method of temporarily plugging permeable earth strata by introducing foam into the strata which has as its gas phase a gas condensable at temperatures and pressures obtaining in the strata. In still another aspect, it relates to a method of producing a well by cyclic steam stimulation or direct drive steam injection by plugging the high permeability strata with a foam having a condensable gas as its gaseous phase.

In oil well production, it is quite common to inject various gases, including steam, into oil wells to increase the production of oil from those wells. One common method of increasing production is the cyclic steam stimulation method, wherein production of oil from the well is periodically interrupted and steam is injected in the well. The steam serves to melt some of the waxes in the strata, and reduce the viscosity of the oil surrounding the well bore so that it will flow more readily into the well bore and be produced therefrom. A second method is the direct drive injection of steam or other gases continuously into one well whereby oils in the various earth strata are pushed ahead of the steam or gas being injected and are produced from another nearby well.

One of the problems faced in either type of injection of gases or steam into the well arises from the varying permeability of the different earth strata. Where there is a considerable difference in the permeability of different strata, the injected gas will flow into the more permeable strata preferentially, or on occasion almost exclusively. Since the oil to be produced may be very largely in the less permeable strata, a considerable quantity of gas or steam will be injected into the well with little success.

Various methods of plugging or sealing off the highly permeable strata so that the steam may be directed into the less permeable strata have been proposed. One method which has been proposed is the introduction of foam into the more permeable strata, by pumping into the well a water solution of a surface active agent. Although this method of plugging has been found effective, there is no way to remove the foam from the more permeable area when desired. After having plugged the more permeable zone and then treated the less permeable zone with the steam to the exhaustion of the oil therein, additional recovery of a well may be obtained by subjecting more permeable strata to steam drive or steam stimulation. However, if the foam is still in place in the more permeable strata, such a steam drive is impractical. Although this foam will eventually collapse, the time for collapse is uncertain, and production of the more permeable strata must be postponed until the foam does collapse.

It is therefore an object of this invention to provide a method for temporarily plugging permeable strata. It is a further object of this invention to provide a process for producing a well by plugging more permeable strata with a self-destructive foam. It is still another object of this invention to use a self-collapsing foam for blocking earth strata.

These and other objects may be accomplished by my invention which is forming in an earth stratum a foam having a condensable gas as its gaseous phase.

By the practice of my invention, I attain the known advantages of foam plugging of highly permeable earth strata, but additionally can control the length of time which those strata will remain plugged, so that they may be again subjected to steam drive or steam stimulation for any length of time desired.

The process of my invention is most advantageously practiced by injecting a small amount of a surface-active agent directly into the steam line at the surface of the well. This surface-active agent will be carried in a solution in the small amount of condensed water in the steam, and will travel into the well. When the surface-active agent reaches the permeable sand or rock strata, it will enter that strata and will then be foamed by the action of the steam pushing through the surfaces of the strata. This foam, however, will have steam as its gaseous phase, as contrasted to normal foams which have air as their gaseous phase. The foam, therefore, will be relatively stable only so long as the temperature of the foam remains above the boiling point of water at the reservoir pressure. If the temperature of the foam drops below that boiling point, the foam will automatically collapse. When this collapsing does occur, the blocked zones will recover their original permeability.

It will thus be seen that the life of the foam in the strata will be dependent upon the heat loss from the strata. For any particular foam, therefore, a certain predictable life span will be available dependent only upon the heat loss rate. Once this rate is known, the length of time for which the strata will be plugged may be calculated.

Figure 2:
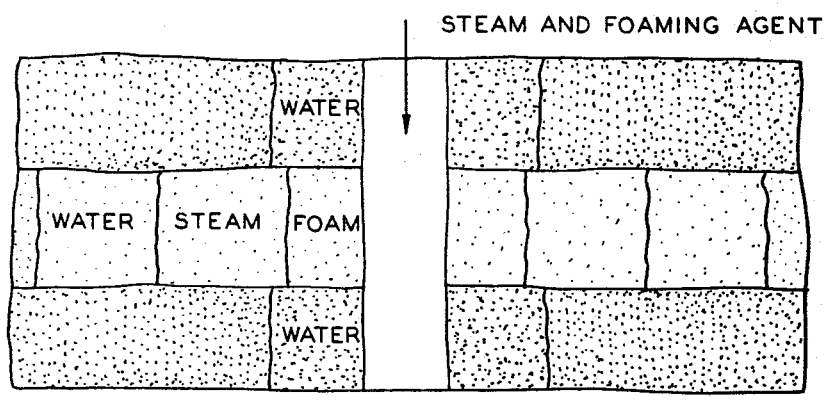
Figure 3:
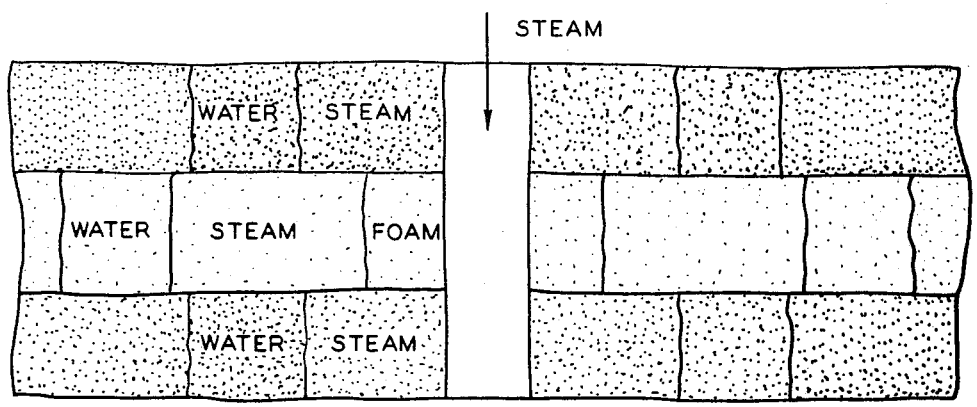

FIGURE 1 shows a cross section of a production strata prior to introduction of a foaming agent. FIGURE 2 is the same strata immediately after introduction of a foaming agent. FIGURE 3 shows the production of lower permeability strata a short time after introduction of the foam.

When steam is injected into a well which traverses higher and lower permeability strata, steam will enter the highest permeability strata almost exclusively, as shown in FIGURE 1. In this drawing, a high permeability strata lies between two low permeability strata. The front of steam, preceded by a zone of water formed from condensed steam, will advance through the high permeability strata, but virtually none of the steam will enter the lower permeability strata.

When foaming agent is injected into the steam according to my invention, steam and foam will enter the high permeability area and will form a foam block as shown in FIGURE 2. Since this block will prevent any further steam from entering the high permeability area, a front of steam will begin to advance through the lower permeability zone as shown in FIGURE 3.

Although the drawings illustrate an idealized permeability situation, it is quite common for the various strata to have permeabilities sufficiently close to each other so that some amount of foam will be formed in the less permeable strata. However, when foam enters both more and less permeable strata, the permeability of the more permeable stratum is reduced to a greater degree than that of the less permeable stratum. One of the factors causing this is a recognized phenomona that foam will reduce the effective permeability of a high permeability sand to a larger extent than the low permeability sand. Additionally, because the steam has been flowing more readily into the more permeable stratum, there is a larger heat input in that stratum compared to the heat loss from the stratum than there is in the less permeable sands. This results in a higher quality steam injected into the higher permeability stratum, and foam produced by this high quality steam will be longer lasting because it must lose more heat before the foam will collapse. Additionally, the high steam flow rate into the high permeability stratum during the initial injection of the foaming agent will carry the foaming agent to a greater depth in the high permeability zone, and therefore form a much thicker wall of foam in that zone than is formed in the less permeable zones. My invention is therefore workable in strata of any relative permeability.

The time in which the foam will collapse may be adjusted by adding a greater or lesser amount of foaming agent to the steam. By balancing the amount of foaming agent, and the particular foaming agent used, a foam of any given time of collapse for a strata of particular heat loss characteristics may be obtained. Once the foam has collapsed, the more permeable zone can be produced in a cyclic stream operation along with the less permeable zone. For prolonged plugging in a more permeable zone, which might be desired in direct steam drive wells, periodic injection of foaming agent will cause formation of a new foam zone when an old one has collapsed.

Although my invention has been described with respect to the use of steam as the condensable gas, it is evident that any gas which is condensable at the temperature and pressure conditions in the particular strata could be used to produce a temporary, self-destructive foam. Additionally, small amounts of non-condensable gases could be mixed with the condensable gas in order to vary the length of life of the foam. In general, however, my invention would be practiced with steam alone because of its low cost and ready availability.

Various types of surface-active agents could be used in the process of my invention, either nonionic, anionic, or cationic. Commercial surface-active agents of the alkyl phenoxy polyethoxy ethanol class and commonly available household cleansers have been tested and found satisfactory in the practice of my invention. For example, Trend detergent manufactured by Purex Corporation, Ltd., has proved satisfactory, as well as other household cleaning compounds, hand and laundry soaps, and rug shampoos.

The benefits of foam blocking in high permeability zones in reservoir formations is shown in the following example: Using two adjacent zones of equal thickness, of permeabilities 4,000 millidarcy and 225 millidarcy, respectively, over 90 percent of the steam will be injected into the 4,000 millidarcy zone with the remaining 10 percent going into the 225 millidarcy zone. After injecting foam into the 4,000 millidarcy zone, less than 18 percent of the steam entered the 4,000 millidarcy zone with 82 percent going into the 225 millidarcy zone.

Nonionic type surface-active agents such as Triton X-100 and Igepal CO-990 are examples of the alkyl phenoxy polyethoxy ethanol class are satisfactory in the practice of my invention. Anionic type surface-active agents such as Alconox and Trend are examples of the alkyl aryl sulfonate class usable in the practice of my invention. Ethomeen 18/60 and Arquad C-50 are examples of cationic surface-active agents which are usable in carrying out my invention, and are identified chemically as stearyl amine polyethylene oxide and n-alkyl trimethyl ammonium chloride, respectively.

Reasonable variation and modification are possible within the scope of the foregoing disclosure, the drawing and the appended claims to the invention, the essence of which is that earth strata may be blocked by forming a foam having a condensable gas as the gas phase in the strata.

I claim:

1. A method for temporarily plugging a permeable strata in subterranean oil bearing formations with a self-collapsing foam so as to be able to control the length of time the strata will remain plugged, which comprises introducing into said permeable strata steam containing a sufficient amount of surface active agent to form a relatively stable foam having steam as the gas phase in said strata and thereby plug same, and allowing said foam to collapse by condensation of said steam at the conditions of temperature and pressure obtaining in said strata.

2. A method according to claim 1 for recovering oil from a formation having an input well and an output well and permeable strata within said formation which is temporarily plugged with a self-collapsing foam so that less permeable strata in the formation can be produced while the more permeable strata is plugged which comprises introducing into said permeable strata steam containing a minor proportion of a surface active agent so as to form a relatively stable foam having steam as the gas phase in said strata, and injecting steam free of surface active agent into said input well under conditions such that a front of steam advances through the less permeable unplugged strata within the formation while allowing said foam to collapse by condensation of steam at the conditions of temperature and pressure existing in the formation.

3. A method according to claim 2 wherein said foam is created by injecting a surface active agent into steam at the well head.

4. A method according to claim 2 wherein said surface active agent and said steam are caused to contact a plurality of strata of relatively varying permeabilities and whereby strata of relatively higher permeability are preferentially blocked by the foam so formed and a front of steam advances through the less permeable unplugged strata within the formation.

5. A method according to claim 4 wherein the steam and surface active agent are injected into the strata through a well bore.

References Cited

UNITED STATES PATENTS

| 2,731,414 | 1/1956 | Binder et al. | 166—10 X |
| 2,866,507 | 12/1958 | Bond et al. | 166—9 |
| 3,185,634 | 5/1965 | Craig et al. | 166—9 |
| 3,207,218 | 9/1965 | Holbrook et al. | 166—32 |
| 3,285,338 | 11/1966 | Boston | 166—9 |
| 3,292,702 | 12/1966 | Boberg | 166—40 |
| 3,302,713 | 2/1967 | Ahearn et al. | 166—9 |
| 3,318,379 | 5/1967 | Bond et al. | 166—9 |
| 3,330,346 | 7/1967 | Jacobs et al. | 166—9 |

STEPHEN J. NOVOSAD, *Primary Examiner.*